United States Patent [19]
Okubo et al.

[11] Patent Number: 5,782,161
[45] Date of Patent: Jul. 21, 1998

[54] AXIAL PLUNGER PUMP WITH A PARTITION BETWEEN THE LUBRICATING CHAMBER AND THE WORKING FLUID CHAMBER

[75] Inventors: Yoshio Okubo, Atsugi; Toshiaki Hori, Hadano; Hiroyuki Watanabe, Sagamihara; Hirokazu Akiba, Atsugi; Mizuo Ohtaki, Hiratsuka, all of Japan

[73] Assignee: Unisia Jecs Corporation, Atsugi, Japan

[21] Appl. No.: 771,918

[22] Filed: Dec. 23, 1996

[30] Foreign Application Priority Data

Dec. 28, 1995 [JP] Japan ................. 7-342693
Jun. 7, 1996 [JP] Japan ................. 8-145674

[51] Int. Cl.[6] ............................................. F01B 3/02
[52] U.S. Cl. ................... 92/71; 417/269; 91/499; 92/153; 184/6.17
[58] Field of Search ............... 92/71; 184/6.17; 91/499; 417/269

[56] References Cited

U.S. PATENT DOCUMENTS

| | | |
|---|---|---|
| 3,507,584 | 4/1970 | Robbins, Jr. ................. 92/71 |
| 3,811,798 | 5/1974 | Bickford . |
| 4,662,267 | 5/1987 | Kaku et al. ................. 417/269 |
| 4,704,073 | 11/1987 | Nomura et al. ................. 417/269 |
| 5,588,347 | 12/1996 | Jepsen ................. 92/71 |

FOREIGN PATENT DOCUMENTS

| | | |
|---|---|---|
| 4-11264 | 1/1992 | Japan . |
| 4-339179 | 11/1992 | Japan . |
| 1067962 | 5/1967 | United Kingdom . |

*Primary Examiner*—Charles G. Freay
*Assistant Examiner*—Cheryl J. Tyler
*Attorney, Agent, or Firm*—Foley & Lardner

[57] ABSTRACT

An axial plunger pump includes an auxiliary plate mounted to a cam plate at an end thereof on the side of a cylinder block to be rotatabe relative to the cam plate, and a flexible partition member interposed between a housing and the auxiliary plate to cover a drive shaft and the cam plate. The flexible partition member, which is in the form of, e.g. a metal bellows, serves to divide the inside of the housing into a working fluid chamber and a lubricant chamber.

10 Claims, 8 Drawing Sheets

AXIAL PLUNGER PUMP WITH A PARTITION BETWEEN THE LUBRICATING CHAMBER AND THE WORKING FLUID CHAMBER

BACKGROUND OF THE INVENTION

The present invention relates to an axial plunger pump which serves as a fuel pressurization pump for use in a fuel injection system for a motor vehicle.

Various types of axial plunger pumps have been proposed in past years. One of which is constructed such that a cam plate is integrally formed with an end of a drive shaft, and a cylinder block is fixedly mounted to a housing to face the cam plate. The cam plate is oscillationally rotated with rotation of the drive shaft, which presses in sequence plungers disposed on the cylinder block to produce repeated protrusion and withdrawal thereof. With protrusion of the plunger, working fluid is inhaled into a cylinder bore through a suction passage. And with withdrawal of the plunger, it is discharge therefrom to a discharge passage.

In recent years, such axial plunger pump often serves as a fuel pressurization pump for use in a fuel injection system for a motor vehicle. However, when the axial plunger pump is used for that purpose, working fluid such as gasoline, which is low in viscosity, leaks from the cylinder block to the housing about a drive-shaft support portion thereof, causing possible lowering of the lubricity of devices such as bearing and sealing member arranged thereabout.

Conventionally, as disclosed, for example, in JP-A 4-339179, such inconvenience is prevented by sealing a clearance between the housing and the cylinder block with a sealing member, and separately supplying lubricant into the housing at a peripheral area of the drive-shaft support portion.

With the known axial plunger pump, however, since the cylinder block has clearances for, e.g. a slide operation of the plungers, a leakage of working fluid from the cylinder block is difficult to be prevented perfectly. Thus, leak working fluid is mixed in lubricant supplied about the drive-shaft support portion, causing possible lowering of the lubricity of the devices arranged thereabout with a lapse of time.

Moreover, with the known axial plunger pump, an attempt to perfectly prevent a leakage of working fluid from the cylinder block makes a sealing construction of the cylinder block complicated, resulting in another inconvenience of increased manufacturing cost.

It is, therefore, an object of the present invention to provide an axial plunger pump which allows excellent sealing of the cylinder block with a simple construction, and improved lubricity of the devices arranged about the drive-shaft support portion of the housing without any increase in manufacturing cost.

SUMMARY OF THE INVENTION

According to one aspect of the present invention, there is provided an axial plunger pump, comprising:

a housing;

a drive shaft rotatably supported to said housing;

a cam plate fixedly mounted to said drive shaft at an end thereof;

a cylinder block fixedly mounted to said housing to face said cam plate;

a plunger axially movably arranged through said cylinder block, said plunger being pressed by rotation of said cam plate to inhale and discharge working fluid, said plunger having on a side of said cam plate formed with a recess;

an auxiliary plate mounted to said cam plate at an end thereof on a side of said cylinder block, said auxiliary plate being rotatable relative to said cam plate; and a flexible partition member interposed between said housing and said auxiliary plate to cover said drive shaft and said cam plate, said flexible partition member serving to divide an inside of said housing into a working fluid chamber and a lubricant chamber.

Another aspect of the present invention lies in providing an axial plunger pump, comprising:

a housing;

a drive shaft rotatably supported to said housing;

a cam plate fixedly mounted to said drive shaft at an end thereof;

a cylinder block fixedly mounted to said housing to face said cam plate;

a plunger axially movably arranged through said cylinder block, said plunger being pressed by rotation of said cam plate to inhale and discharge working fluid, said plunger having on a side of said cam plate formed with a recess;

an auxiliary plate mounted to said cam plate at an end thereof on a side of said cylinder block, said auxiliary plate being rotatable relative to said cam plate; and means for covering said drive shaft and said cam plate, said covering means serving to divide an inside of said housing into a working fluid chamber and a lubricant chamber.

DETAILED DESCRIPTION OF THE INVENTION

Figure 1:
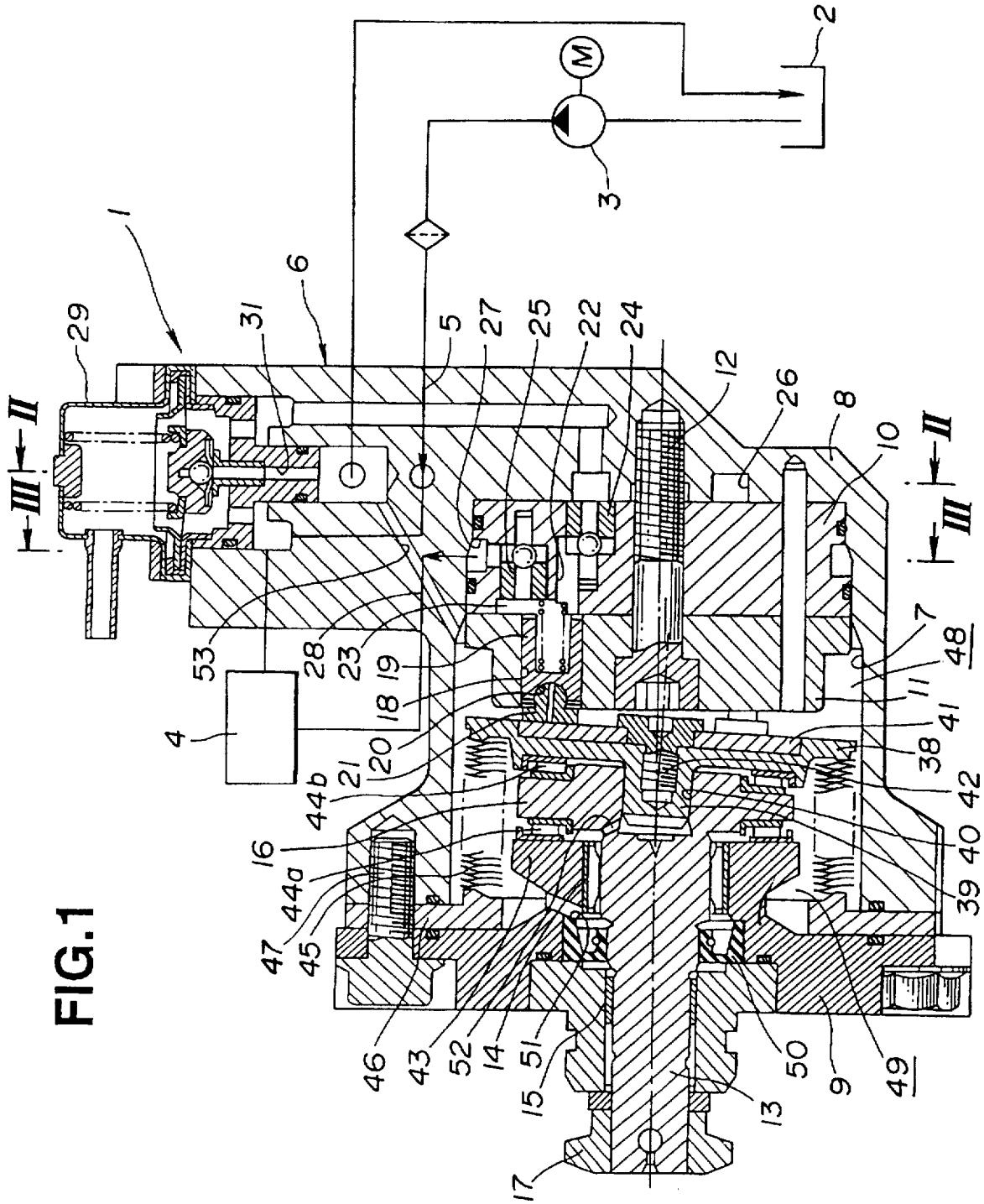
FIG. 1 is a longitudinal section showing a first preferred embodiment of an axial plunger pump according to the present invention.

Referring to the drawings, a description will be made with regard to preferred embodiments of an axial plunger pump according to the present invention.

FIGS. 1–6 show a first embodiment of the present invention. Referring to FIG. 1, an axial plunger pump 1 according to the present invention serves as a fuel pressurization pump for use in a fuel injection system for a motor vehicle. The axial plunger pump 1 serves to pressurize to a predetermined pressure low-pressure working fluid or fuel such as gasoline supplied from a fuel tank 2 through a feed pump 3, which is supplied to an injector 4 for injection into engine cylinders, not shown. Moreover, the axial plunger pump 1 serves to return surplus working fluid from the injector 4 to a suction passage 5 thereof.

The axial plunger pump 1 includes a housing 6 comprising a main body 8 with a recess 7, and a front cover 9 mounted to the main body 8 at a front end thereof. In the recess 7 of the housing main body 8, a valve block 10 and a cylinder block 11 are coupled with each other by a bolt 12. A drive shaft 13 is supported to the front cover 9 through a radial bearing 14 comprising a needle bearing and a radial bearing 15 comprising a metal bearing. The drive shaft 13 has one end facing the housing 6, with which a cam plate 16 is integrally formed having an end face inclined at a predetermined angle with respect to an axis of the drive shaft 13. The drive shaft 13 has another end protruding outwardly from the housing 6, to which a coupling 17 is mounted for connection with an engine camshaft, not shown.

Figure 2:
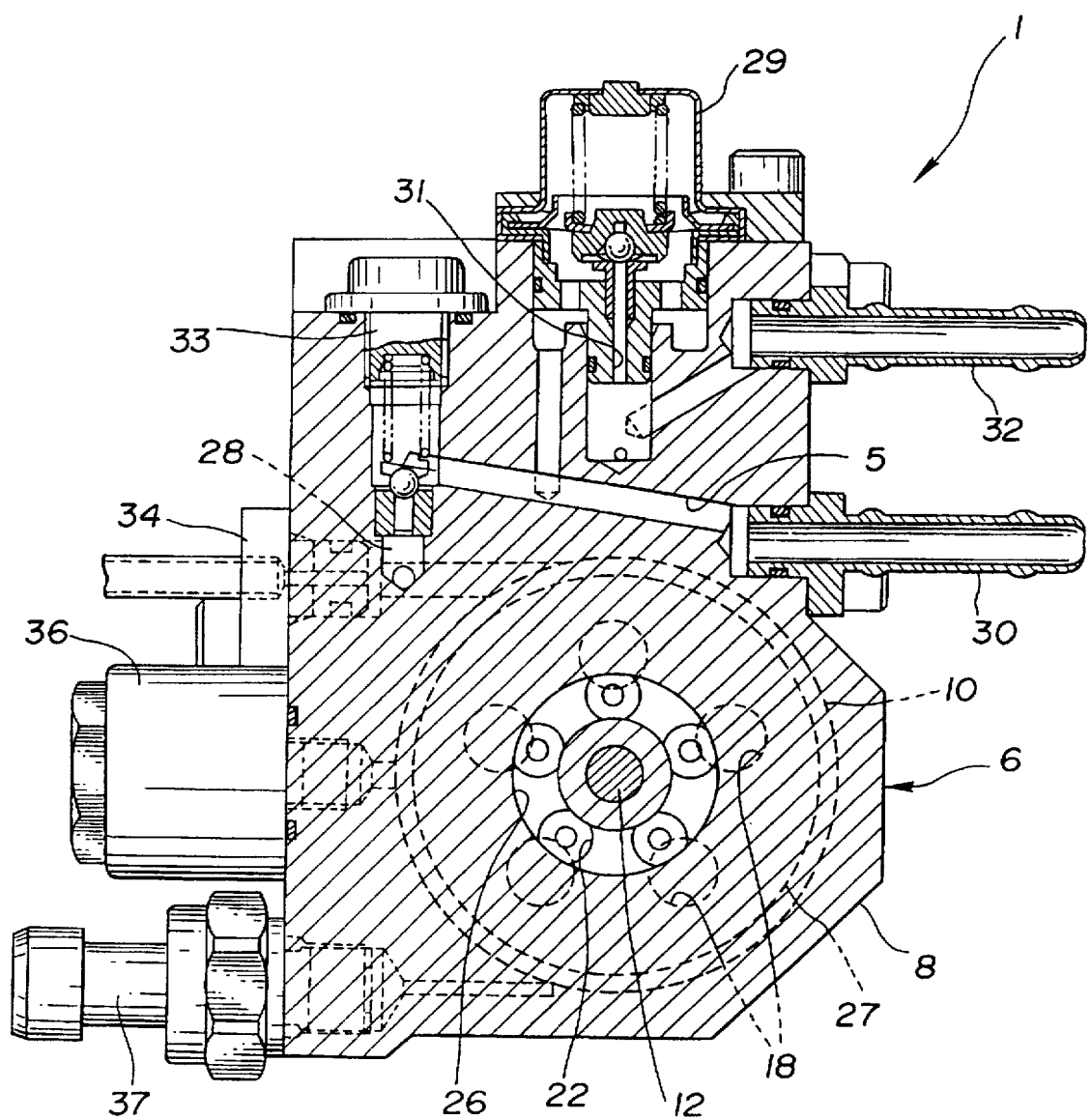
FIG. 2 is a cross section taken along the line II—II in FIG. 1.

Referring also to FIG. 2, the cylinder block 11 has cylinder bores 18 formed cicumferentially equidistantly to extend axially, in which plungers 19 are movably received in being spring-biased to the cam plate 16. Each plunger 19 has a top face formed with a semispherical recess 20 with which a shoe 21 as will be described later is rotatably engaged. The valve block 10 which backs onto the cylinder block 11 is formed with suction ports 22 and discharge ports 23 communicating with the cylinder bores 18 of the cylinder block 11. A suction check valve 24 is arranged in each suction port 22, whereas a discharge check valve 25 is arranged in each discharge port 23. All the suction ports 22 communicate with a suction-side annular groove 26 formed in the housing main body 8 on the back of the valve block 10, which communicates with the suction passage 5 of the housing main body 8. On the other hand, all the discharge ports 23 communicate with a discharge-side annular groove 27 formed in the valve block 10 at the outer periphery thereof, which communicates with the discharge passage 28 of the housing main body 8. Therefore, in accordance with movement of the plunger 19 in the cylinder bore 18, working fluid is inhaled into the cylinder bore 18 via the suction-side annular groove 26, which is discharged to the discharge passage 28 via the discharge-side annular groove 27.

Figure 3:
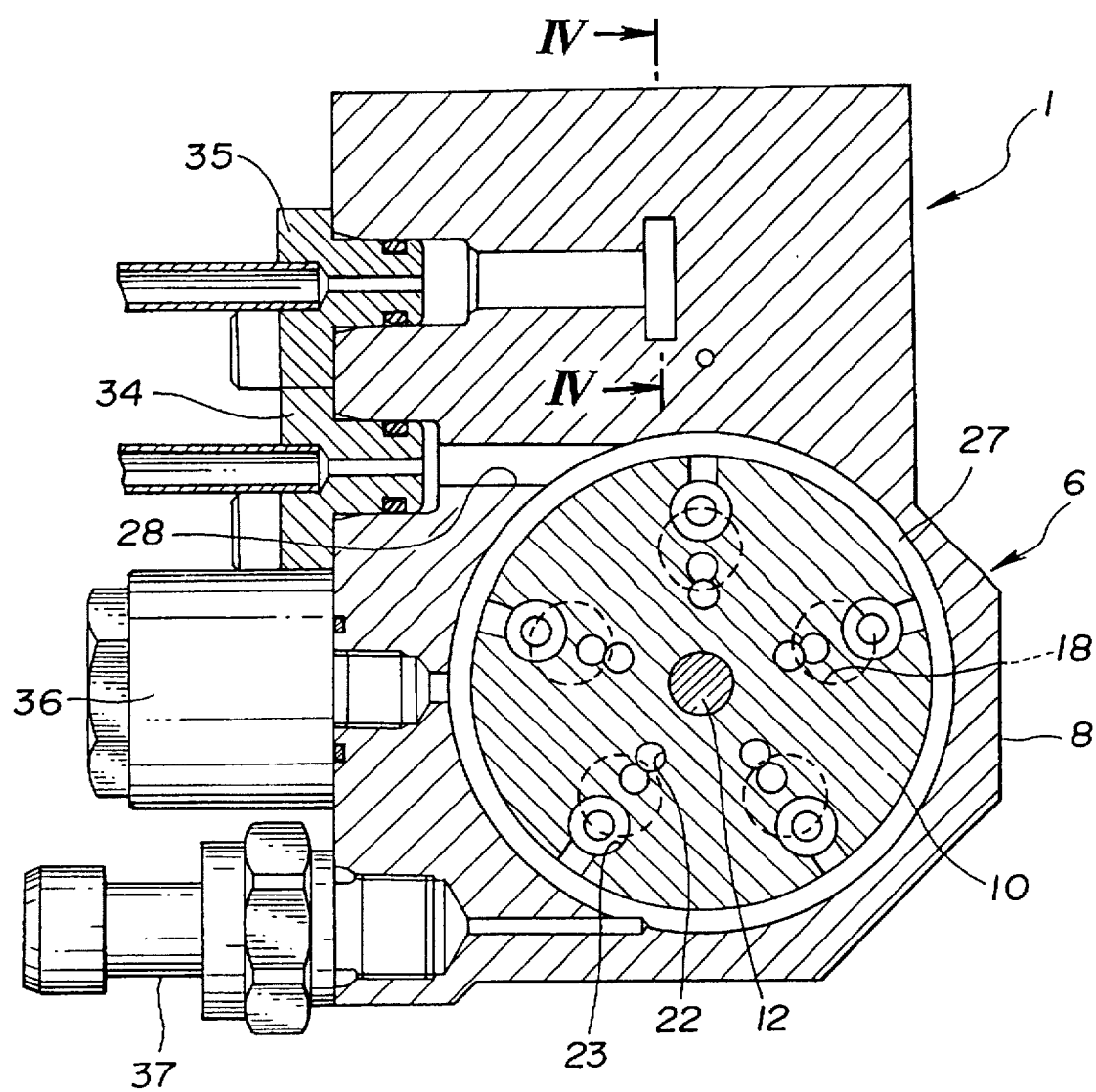
FIG. 3 is a view similar to FIG. 2, taken along the line III—III in FIG. 1.
Figure 4:
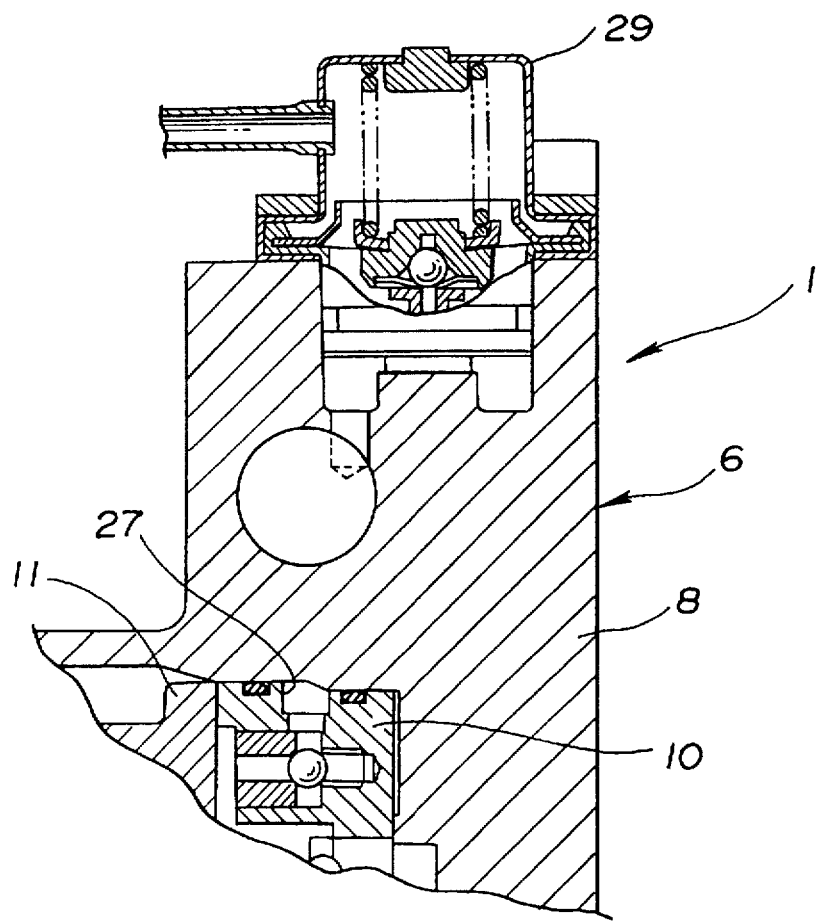
FIG. 4 is a view similar to FIG. 1, taken along the line IV—IV in FIG. 3.

Referring also to FIG. 4, a low pressure regulator 29 is interposed between a suction-pipe connecting plug 30 of the suction passage 5 and the suction-side annular groove 26 to maintain a suction pressure at a constant low value. The low pressure regulator 29 has a drain port 31 communicating with the fuel tank 2 through a return-pipe connecting plug 32. Referring also to FIG. 3, a safety valve 33 is interposed between a discharge-pipe connecting plug 34 of the discharge passage 28 and the discharge-side annular groove 27 to decrease a pressure within the discharge passage 28 when exceeding a set pressure by partly returning working fluid from the discharge passage 28 to the suction passage 5. 35 designates a return-pipe connecting plug 35 on the side of the injector 4, 36 designates an accumulator connected to the discharge-side annular groove 27 for preventing a pulsating pressure, and 37 designates a discharge pressure sensor.

Referring to FIG. 1, a disk-like auxiliary plate 38 is relatively rotatably mounted on an end face of the cam plate 16 formed to the drive shaft 13. The auxiliary plate 38 has a boss 39 arranged in the center thereof, which is relatively rotatably engaged with a support hole 40 formed in the center of the end face of the cam plate 16. A thrust plate 41 having high hardness and low friction coefficient is rotatably mounted through a bolt 42 to the auxiliary plate 38 on an end face thereof on the side of the cylinder block 11. The shoe 21 engaged with the plunger 19 slidably contacts the thrust plate 41. Since the plunger 19 is spring-biased to the cam plate 16 as described above, the shoe 21, which undergoes a biasing force of the plunger 19, is always pressed on the thrust plate 41. A load support flange 43 is arranged to the front cover 9 on the back of the cam plate 16. Thrust bearings 44a, 44b comprising a needle bearing are interposed between the load support flange 43 and the cam plate 16, and between the cam plate 16 and the auxiliary plate 38, respectively. An axial component of a reaction force which the auxiliary plate 38 receives from the plunger 19 is supported by the load support flange 43 of the front cover 9 through the thrust bearings 44a, 44b. On the other hand, a radial component of the reaction force is supported by an engaged portion of the boss 39 of the auxiliary plate 38 with the support hole 40 of the drive shaft 13.

Hermetically connected to an outer peripheral edge of the auxiliary plate 38 is one end of a flexible partition member or a metal bellows 45 for covering substantially from a drive-shaft support portion of the housing 6 to the cam plate 16. The bellows 45 comprises a so-called welded bellows having annular metal plates welded to each other. Another end of the bellows 45 is also hermetically connected to an annular mounting flange 46 which has an outer peripheral edge interposed between the housing main body 8 and the front cover 9, and connected to the housing main body 8 together with the front cover 9 through a bolt 47. The bellows 45 has an inside space encircling the drive-shaft support portion of the housing 6, which is filled with lubricant having a predetermined viscosity. Specifically, the bellows 45 serves to dividing the inside of the housing 6 into a working fluid chamber 48 filled with working fluid leaking from the cylinder block 11, and a lubricant chamber 49 filled with lubricant. The bellows 45 is previously welded to the auxiliary plate 38 and the mounting flange 46 so as to obtain an integrated unit which is assembled to the housing 6 when manufacturing the axial plunger pump 1.

An oil seal 50 is arranged adjacent to the radial bearing 14 for supporting the drive shaft 13. An introduction bore 51 is formed through the load support flange 43 of the front cover 9 to surely provide lubricant to the oil seal 50 and the radial bearing 14. Moreover, an introduction bore 52 is formed through a corner of the drive shaft facing the cam plate 16 to ensure communication of a bottom of the support hole 40 of the cam plate 16 with the outer periphery of the drive shaft 13. The introduction bore 52 serves to introduce lubricant to a clearance between the support hole 40 and the boss 39 of the auxiliary plate 38. A drain passage 53 is arranged to return to the fuel tank 2 working fluid leaking in the recess 7 of the housing main body 8 or the working fluid chamber 48.

With the above structure, the drive shaft 13 is rotated with engine start, which causes rotation of the cam plate 16 integrated with the drive shaft 13. Thus, the auxiliary plate 38, which is prevented from rotating by the bellows 45, is rotated relative to the cam plate 16, and oscillated therewith. Oscillation of the auxiliary plate 38 produces repeated protrusion and withdrawal of the plungers 19 disposed on the cylinder block 11 through the thrust plate 41 and the shoe 21 which is in slide contact therewith, carrying out continuous pump operation. At that time, working fluid supplied from the fuel tank 2 to the suction-pipe connecting plug 30 through the feed pump 3 is adjusted to a set low pressure by the low pressure regulator 29 in the middle of the suction passage 5. It is then inhaled, via the suction-side annular groove 26, the suction port 22 and the suction check valve 24 in sequence, into the cylinder bore 18 for pressurization by the plunger 19. Subsequently, it is supplied from the cylinder bore 18, via the discharge check valve 25, the discharge port 23, the discharge-side annular groove 27, the discharge passage 28 and the discharge-pipe connecting plug 34 in sequence, to the injector 4. Surplus working fluid from the injector 4 is returned to the suction passage 5 in the vicinity of the low pressure regulator 29 through the return-pipe connecting plug 35.

With continuous operation of the axial plunger pump 1, working fluid leaks from a clearance between the cylinder block 11 and the valve block 10, a clearance between the cylinder bore 8 and the plunger 19, etc. to the recess 7 of the housing main body 8. However, since the recess 7 is hermetically divided into the working fluid chamber 48 and the lubricant chamber 49 by the auxiliary plate 38 and the bellows 45, working fluid having low viscosity does not flow to the bearings 14, 15, 44a, 44b located about the drive-shaft support portion of the housing 6, and the oil seal 50. On the other hand, the lubricant chamber 49 is filled with lubricant having a predetermined viscosity, which is always supplied to the bearings 14, 15, 44a, 44b and the oil seal 50, securing long maintenance of the initial performance thereof.

According to the first embodiment, the partition member for defining the working fluid chamber 48 and the lubricant chamber 49, which is in the form of the bellows 45 and thus deformable in its entirety, can flexibly follow oscillation of the auxiliary plate 38, resulting in no occurrence of inconveniences of concentration of a stress to the partition member and increase in power loss. Moreover, the bellows 45, which is made of a metal and has a extremely high durability, does not deteriorate after a long use.

Moreover, according to the first embodiment, the shoe 21 is not in slide contact with the auxiliary plate 38, but with the thrust plate 41 having high hardness and low friction coefficient and mounted to the auxiliary plate 38, so that, if the auxiliary plate 38 is made of a stainless steel having excellent weldability and corrosion resistance, but low hardness, wear and seizure of the shoe 21 does not occur.

Figure 5:
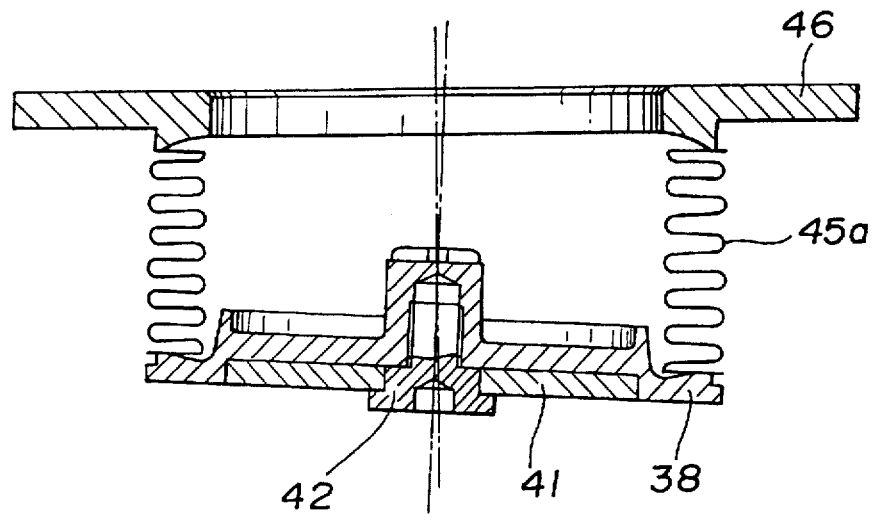
FIG. 5 is a fragmentary longitudinal section showing a variant of a bellows.
Figure 6:
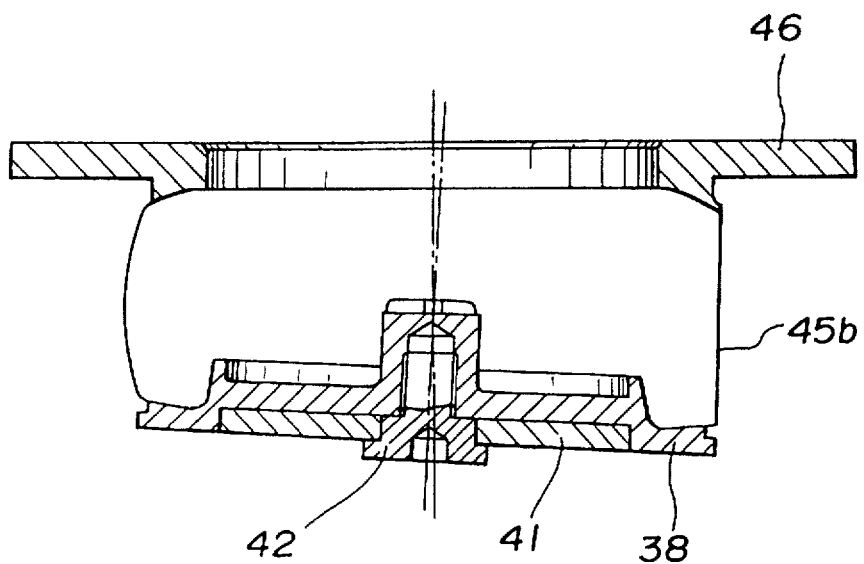
FIG. 6 is a view similar to FIG. 5, showing another variant of the bellows.

In the first embodiment, the bellows is in the form of the welded bellows having annular metal plates welded to each other, alternately, it may be in the form of a bellows 45a having a single metal member as shown in FIG. 5. Moreover, the bellows may be made of a rubber or a resin instead of a metal. With this variant, the bellows can be manufactured in lower cost.

Moreover, in the first embodiment, the partition member for dividing the housing 6 into the working fluid chamber 48 and the lubricant chamber 49 is in the form of the bellows 45. Alternatively, referring to FIG. 6, the partition member, designated by 45b, may be in the form of a thin rubber or resin member gently curved from a junction with the mounting flange 46 to that with the auxiliary plate 38. With this variant, the partition member can be manufactured in lower cost.

Figure 7A:
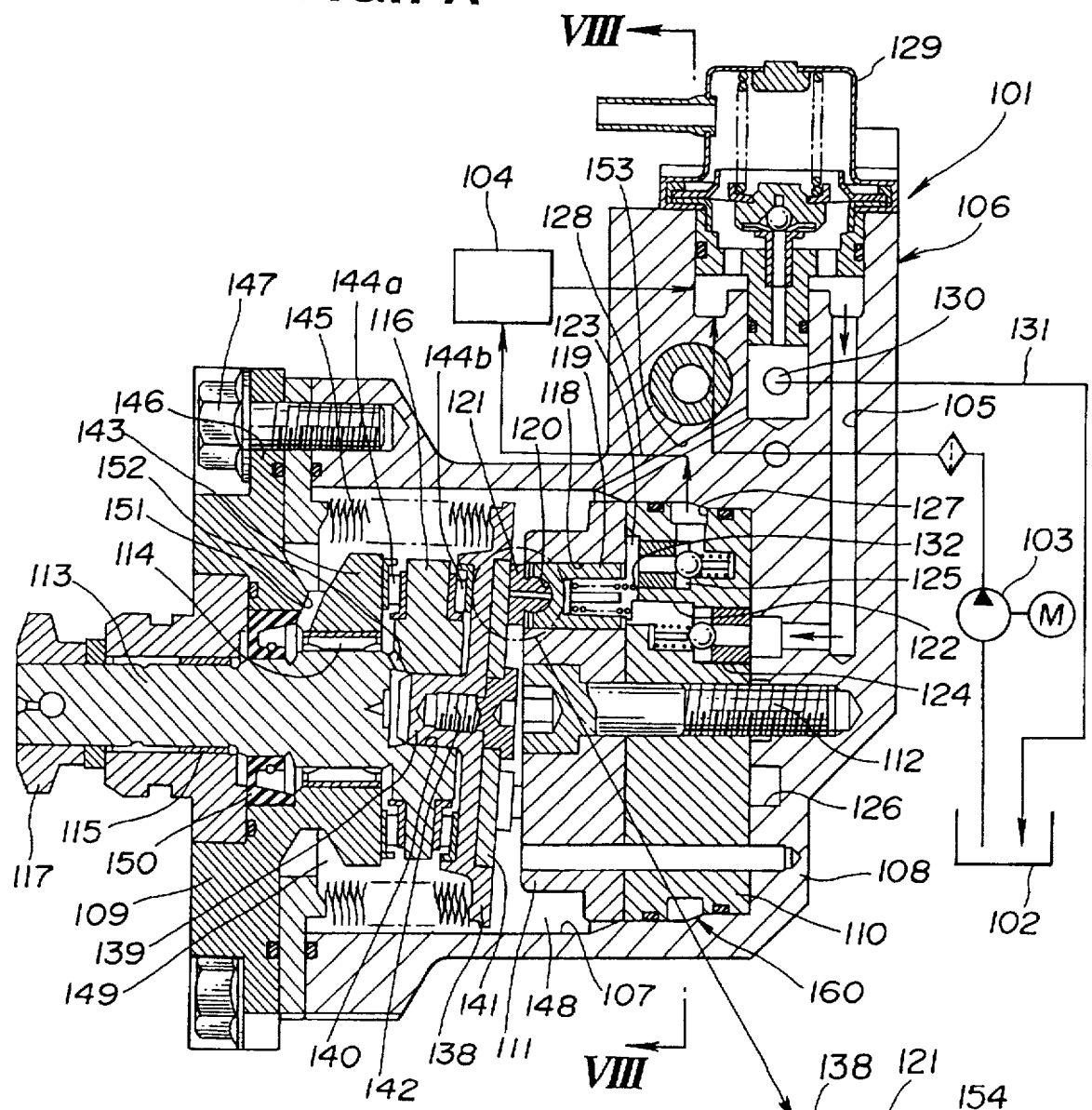
FIG. 7A is a view similar to FIG. 1, showing a second preferred embodiment of the present invention.

Referring to FIGS. 7A–10 show a second embodiment of the present invention. Referring to FIG. 7A, an axial plunger pump 101 according to the present invention serves as a fuel pressurization pump for use in a fuel injection system for a motor vehicle. The axial plunger pump 101 serves to pressurize to a predetermined pressure low-pressure working fluid or fuel such as gasoline supplied from a fuel tank 102 through a feed pump 103, which is supplied to an injector 104 for injection into engine cylinders, not shown. Moreover, the axial plunger pump 101 serves to return surplus working fluid from the injector 104 to a suction passage 105 thereof.

The axial plunger pump 101 includes a housing 106 comprising a main body 108 with a recess 107, and a front cover 109 mounted to the main body 108 at a front end thereof. A pump function block 160 as will be described later is fixed in the recess 107 of the housing main body 108. A drive shaft 113 is supported to the front cover 109 through a radial bearing 114 comprising a needle bearing and a radial bearing 115 comprising a metal bearing. The drive shaft 113 has one end facing the housing 106, with which a cam plate 116 is integrally formed having an end face inclined at a predetermined angle with respect to an axis of the drive shaft 113. The drive shaft 113 has another end protruding outwardly from the housing 106, to which a coupling 117 is mounted for connection with an engine camshaft, not shown.

The pump function block 160 comprises two axially divided portions, i.e. a cylinder block 111 for axially accommodating plungers 119, and a valve block 110 for accommodating suction and discharge check valves 124, 125, which are fixed to a bottom of the housing 106 by a bolt 112 arranged through the center thereof. The cylinder block 111 is made of a ferrous metal having high hardness, whereas the valve block 110 is made of an aluminum.

Figure 8:
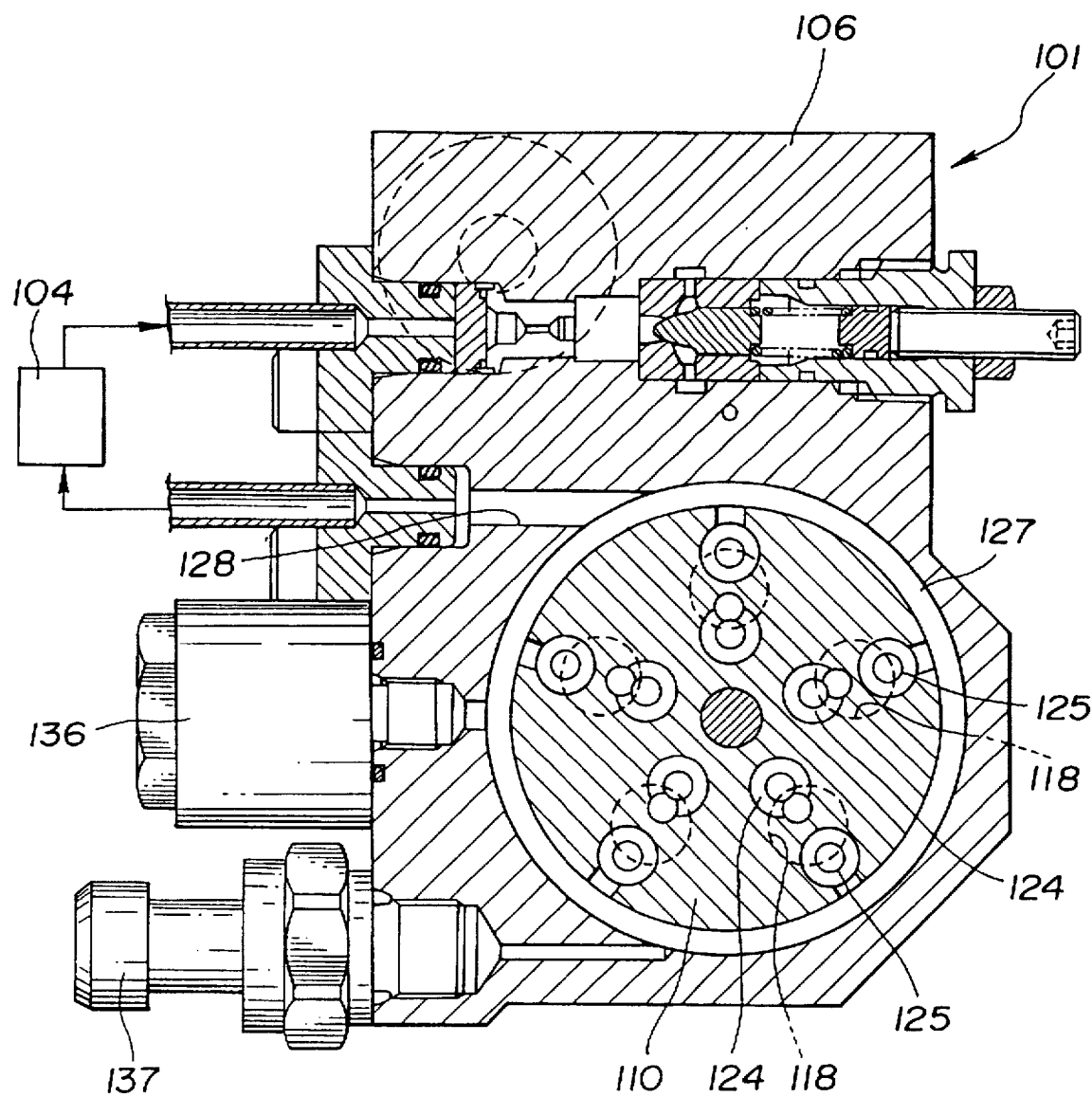
FIG. 8 is a view similar to FIG. 3, taken along the line VIII—VIII in FIG. 7.
Figure 9:
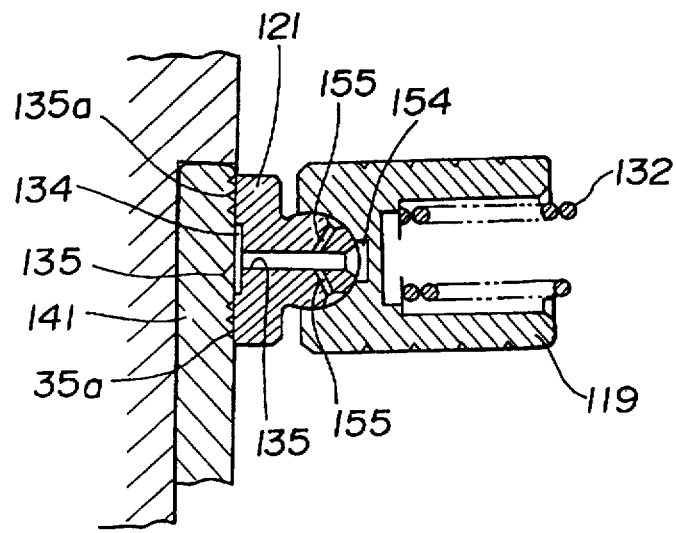
FIG. 9 is 7, a view similar to FIG. 7B, showing a variant of the shoe.

Referring also to FIG. 8, the cylinder block 111 has cylinder bores 118 formed cicumferentially equidistantly to extend axially, in which received are plungers 119 and springs 132 for biasing the plungers 119 to the cam plate 116. A bottom of each cylinder bore 118 is closed by an end face of the valve block 110. That is, the cylinder block 111 and the valve block 110 are separated so that the end face of the valve block 110 closes the bottom of each cylinder bore 118 formed through the cylinder block 111. Each plunger 119 received in the cylinder bore 118 has an end face formed with a semispherical recess 120 with which a shoe 121 as will be described later is slidably engaged.

The valve block 110 is formed with suction ports 122 and discharge ports 123 communicating with the cylinder bores 118 of the cylinder block 111. A suction check valve 124 is arranged in each suction port 122, whereas a discharge check valve 125 is arranged in each discharge port 123. All the suction ports 122 communicate with a suction-side annular groove 126 formed in the housing main body 108 on the back of the valve block 110, which communicates with the suction passage 105 of the housing main body 108. On the other hand, all the discharge ports 123 communicate with a discharge-side annular groove 127 formed in the valve block 110 at the outer periphery thereof, which communicates with the discharge passage 128 of the housing main body 108. Therefore, in accordance with movement of the plunger 119 in the cylinder bore 118, working fluid is inhaled into the cylinder bore 118 via the suction-side annular groove 126, which is discharged to the discharge passage 128 via the discharge-side annular groove 127.

A low pressure regulator 129 is interposed between a suction-pipe connecting port, not shown, of the suction passage 105 and the suction-side annular groove 126 to maintain a suction pressure at a constant low value. The low pressure regulator 129 has a drain port 130 communicating with the fuel tank 2 through a return pipe 131. 136 designates an accumulator connected to the discharge-side annular groove 127 for preventing a pulsating pressure, and 137 designates a discharge pressure sensor.

Referring to FIG. 7A, a disk-like auxiliary plate 138 is relatively rotatably mounted on an end face of the cam plate 116 formed to the drive shaft 113. The auxiliary plate 138 has a boss 139 arranged in the center thereof, which is relatively rotatably engaged with a support hole 140 formed in the center of the end face of the cam plate 116. A thrust plate 141 having high hardness and low friction coefficient is rotatably mounted through a bolt 142 to the auxiliary plate 138 on an end face thereof on the side of the cylinder block 111. A flat end face of the shoe 121 slidably contacts a cam-plate-side end face of the thrust plate 141. Since the plunger 119 is spring-biased to the cam plate 116 as described above, the end face of the shoe 121, which undergoes a biasing force of the plunger 119, is always pressed on the thrust plate 141.

A load support flange 143 is arranged to the front cover 109 on the back of the cam plate 116. Thrust bearings 144a, 144b comprising a needle bearing are interposed between the load support flange 143 and the cam plate 116, and between the cam plate 116 and the auxiliary plate 138, respectively. An axial component of a reaction force which the auxiliary plate 138 receives from the plunger 119 is supported by the load support flange 143 of the front cover 109 through the thrust bearings 144a, 144b. On the other hand, a radial component of the reaction force is supported by an engaged portion of the boss 139 of the auxiliary plate 138 with the support hole 140 of the drive shaft 113.

Hermetically connected to an outer peripheral edge of the auxiliary plate 138 is one end of a metal bellows 145 for covering substantially from a drive-shaft support portion of the housing 106 to the cam plate 116. Another end of the bellows 145 is also hermetically connected to an annular mounting flange 146 which has an outer peripheral edge interposed between the housing main body 108 and the front cover 109, and connected to the housing main body 108 together with the front cover 109 through a bolt 147. The bellows 145 has an inside space encircling the drive-shaft support portion of the housing 106, which is filled with lubricant having high viscosity. Specifically, the bellows 145 serves to dividing the inside of the housing 106 into a pump low-pressure chamber 148 filled with working fluid having low viscosity which leaks from the cylinder block 111, and a lubricant chamber 149 filled with lubricant having high viscosity.

An oil seal 150 is arranged adjacent to the radial bearing 114 for supporting the drive shaft 113. An introduction bore 151 is formed through the load support flange 143 of the front cover 109 to surely provide lubricant to the oil seal 150 and the radial bearing 114. Moreover, an introduction bore 152 is formed through a corner of the drive shaft facing the cam plate 116 to ensure communication of a bottom of the support hole 140 of the cam plate 116 with the outer periphery of the drive shaft 113. The introduction bore 152 serves to introduce lubricant to a clearance between the support hole 140 and the boss 139 of the auxiliary plate 138.

Figure 7B:
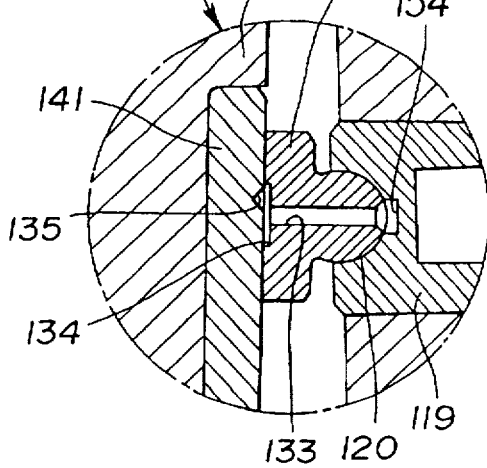
FIG. 7B is a fragmentary enlarged view of FIG. 7, showing a shoe.

Referring to FIG. 7B, the shoe 121 interposed between the plunger 119 and the cam-plate-side end face of the thrust plate 141 has a through hole 133 formed along an axis thereof to ensure communication of the flat end face on the cam plate side with a spherical end face on the plunger side. A cam-plate-side end of the through hole 133 has a larger diameter portion 134. On the other hand, the end face of the thrust plate 141 is formed with an annular groove 135 having a V-shaped section to communicate with the larger diameter portion 134 of the through hole 133 of the shoe 121. The diameter of the annular groove 135 is determined in taking account of a radial displacement of a shoe contacting portion of the thrust plate 141 with oscillation of the cam plate 116 so that the annular groove 135 does not deviate from the range of the larger diameter portion 134 of the shoe 121. The annular groove 135 of the thrust plate 141 and the through hole 133 of the shoe 121, which constitute a working fluid supply passage, serve to supply working fluid from the pump low-pressure chamber 148 to a contact portion of the thrust plate 141 with the shoe 121, and a spherical contact portion of the shoe 121 with the plunger 119. A hollow 154 is formed in the recess 120 of the plunger 119 to preserve working fluid introduced from the pump low-pressure chamber 148 via the through hole 133. A drain passage 153 is arranged to return to the fuel tank 102 working fluid leaking in the pump low-pressure chamber 148 through a clearance between the housing main body 108 and the pump function block 160.

With the above structure, the drive shaft 113 is rotated with engine start, which causes rotation of the cam plate 116 integrated with the drive shaft 113. Thus, the auxiliary plate 138, which is prevented from rotating by the bellows 145, is rotated relative to the cam plate 116, and oscillated therewith. Oscillation of the auxiliary plate 138 produces repeated protrusion and withdrawal of the plungers 119 disposed on the cylinder block 111 through the thrust plate 141 and the shoe 121 which is in slide contact therewith, carrying out continuous pump operation. At that time, working fluid supplied from the fuel tank 102 to the suction passage 105 through the feed pump 103 is adjusted to a set low pressure by the low pressure regulator 129 in the middle of the suction passage 105. It is then inhaled, via the suction-side annular groove 126, the suction port 122 and the suction check valve 124 in sequence, into the cylinder bore 118 for pressurization by the plunger 119. Subsequently, it is supplied from the cylinder bore 118, via the discharge check valve 125, the dicharge port 123, the discharge-side annular groove 127 and the discharge passage 128 in sequence, to the injector 104. Surplus working fluid from the injector 104 is returned to the suction passage 105.

When power is transmitted from the thrust plate 141 to the plunger 119 upon operation of the axial plunger pump 101, the shoe 121 is slidingly moved with respect to the thrust plate 141 and the corresponding plunger 119 in undergoing a large axial load. Since a sufficient amount of working fluid within the pump low-pressure chamber 148 is supplied to the contact portion of the thrust plate 141 with the shoe 121 through the annular groove 135 of the thrust plate 141, and to the spherical contact portion of the shoe 121 with the plunger 119 through the annular groove 135 and the through hole 133 of the shoe 121, i.e. lubrication of the above contact portions is surely carried out with working fluid, the friction resistance thereof is always restrained at a low value. Particularly, working fluid is supplied to the contact portions in the vicinity of the center thereof, obtaining efficient lubrication of the contact portions. In other words, working fluid within the pump low-pressure chamber 148, which is the most difficult to directly flow into the contact portions in the vicinity of the center thereof, is supplied thereto through the annular groove 135 and the through hole 133, obtaining substantially uniform lubrication of the whole area of the contact portions.

According to the second embodiment, since working fluid is not supplied to the above contact portions from the inside of the plunger 119, but from the annular groove 135 of the thrust plate 141 and the through hole 133 of the shoe 121, a leakage of working fluid from the plunger 119 may not be increased. It will be thus understood that the axial plunger pump 101 enables working fluid to efficiently be pressurized to a high value.

Moreover, according to the second embodiment, the working fluid supply passage comprises the annular groove 135 of thrust plate 141 and the through hole 133 of the shoe 121, which are easy to be formed by simple machining only, resulting in a possible reduction in manufacturing cost. Further, simultaneous formation of the annular groove 135 of the thrust plate 141 upon formation of the external shape thereof enables a further reduction in manufacturing cost.

It is noted that the present invention can be realized in the different way from the second embodiment. By way of example, referring to FIG. 9, branch holes 155 may be formed through the shoe 121 to radially branch off from the through hole 133 in the middle thereof, each having an opening in a position deviated from the top of the end face of the plunger 119. Moreover, auxiliary annular grooves 135a, 35a may be formed in the thrust plate 141 in radially inward and outward positions thereof. Formation of the branch holes 155 enables sure supply of working fluid to the whole area of the spherical contact portion of the shoe 121 with the plunger 119, whereas formation of the auxiliary annular grooves 135a, 35a enables sure supply of working fluid to the whole area of the contact portion of the shoe 121 with the thrust plates 141.

Figure 10:
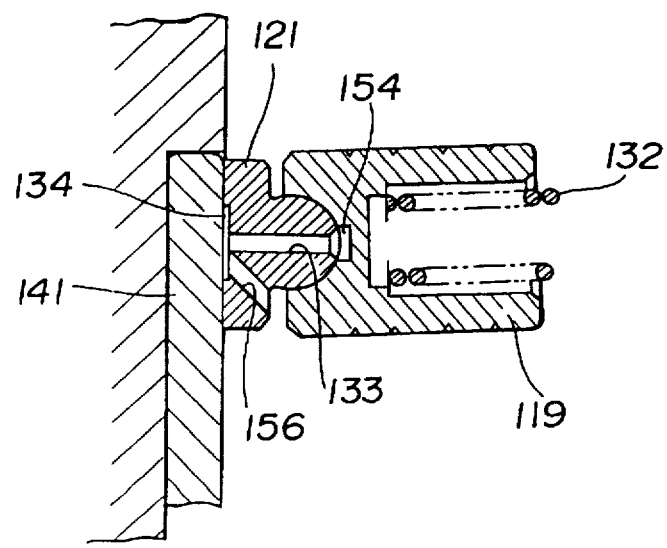
FIG. 10 is a view similar to FIG. 9, showing another variant of the shoe.

Further, referring to FIG. 10, without forming the annular groove 135 in the thrust plate 141, an introduction hole 156 may be formed through the shoe 121 to ensure direct communication of the thrust-plate-side end of the through hole 133 with the outer peripheral face of the shoe 121. With this variant, there is no need to machine the thrust plate 141.

Furthermore, in the second embodiment, the axial plunger pump 101 is of the type that the cam plate 116 rotates, alternatively, it may be of the type that the cylinder block 111 rotates.

What is claimed is:

1. An axial plunger pump, comprising:

a housing;

a drive shaft rotatably supported to said housing;

a cam plate fixedly mounted to said drive shaft at an end thereof;

a cylinder block fixedly mounted to said housing to face said cam plate;

a plunger axially movably arranged through said cylinder block, said plunger being pressed by rotation of said cam plate to inhale and discharge working fluid, said plunger having on a side of said cam plate formed with a recess;

an auxiliary plate mounted to said cam plate at an end thereof on a side of said cylinder block, said auxiliary plate being rotatable relative to said cam plate; and a flexible partition member interposed between said housing and said auxiliary plate to cover said drive shaft and said cam plate, said flexible partition member serving to divide an inside of said housing into a working fluid chamber and a lubricant chamber.

2. An axial plunger pump as claimed in claim 1, wherein said flexible partition member is made of a metal.

3. An axial plunger pump as claimed in claim 1, wherein said flexible partition member is made of one of a rubber and a resin.

4. An axial plunger pump as claimed in claim 3, wherein said flexible partition member comprises a bellows.

5. An axial plunger pump as claimed in claim 4, wherein said bellows comprises annular plates welded to each other.

6. An axial plunger pump as claimed in claim 4, wherein said bellows comprises a single member.

7. An axial plunger pump as claimed in claim 1, further comprising:

a thrust plate mounted to said auxiliary plate at an end thereof on said side of said cylinder block, said thrust plate being rotatable relative to said auxiliary plate;

a shoe interposed between said plunger and said thrust plate, said shoe having an end slidably engaged with said recess of said plunger; and means for defining a passage to ensure fluid communication of a clearance between said recess of said plunger and said end of said shoe with a pump low-pressure chamber arranged outside of said shoe.

8. An axial plunger pump as claimed in claim 7, wherein said passage defining means include a clearance between said thrust plate and another end of said shoe.

9. An axial plunger pump as claimed in claim 8, wherein said passage defining means include an annular groove of said thrust plate and a through hole of said shoe.

10. An axial plunger pump, comprising:

a housing;

a drive shaft rotatably supported to said housing;

a cam plate fixedly mounted to said drive shaft at an end thereof;

a cylinder block fixedly mounted to said housing to face said cam plate;

a plunger axially movably arranged through said cylinder block, said plunger being pressed by rotation of said cam plate to inhale and discharge working fluid, said plunger having on a side of said cam plate formed with a recess;

an auxiliary plate mounted to said cam plate at an end thereof on a side of said cylinder block, said auxiliary plate being rotatable relative to said cam plate; and means for covering said drive shaft and said cam plate, said covering means serving to divide an inside of said housing into a working fluid chamber and a lubricant chamber.

* * * * *